United States Patent [19]

Day et al.

[11] 4,022,129

[45] May 10, 1977

[54] NOZZLE EJECTION SYSTEM

[75] Inventors: John E. Day, Truckee; Phil D. La Force, Los Gastos, both of Calif.

[73] Assignee: The United States of America as represented by the Secretary of the Air Force, Washington, D.C.

[22] Filed: Jan. 16, 1976

[21] Appl. No.: 649,765

[52] U.S. Cl. .......................... 102/49.5; 239/265.19
[51] Int. Cl.² ........................................ B64C 15/02
[58] Field of Search .................. 102/49.4, 49.5; 239/265.15, 265.19

[56] References Cited

UNITED STATES PATENTS

| 3,011,309 | 12/1961 | Carter | 102/49.4 |
|---|---|---|---|
| 3,177,655 | 4/1965 | White | 102/49.5 |
| 3,237,402 | 3/1966 | Steverding | 102/49.5 |
| 3,292,542 | 12/1966 | White | 102/49.5 |
| 3,329,089 | 7/1967 | Harrison | 102/49.4 |
| 3,427,047 | 2/1969 | Mayo | 102/49.5 |
| 3,468,127 | 9/1969 | Rosser | 239/265.15 |
| 3,688,988 | 9/1972 | Howison | 239/265.15 |
| 3,855,789 | 12/1974 | Platzek | 239/265.19 |

*Primary Examiner*—Verlin R. Pendegrass
*Attorney, Agent, or Firm*—Joseph E. Rusz; Jacob N. Erlich

[57] ABSTRACT

A nozzle ejection system having an outer nozzle, an inner nozzle located within the outer nozzle and a snap ring within the outer nozzle for holding the inner nozzle in place. An explosive charge is operatively connected to the snap ring, with the explosive charge detonating at a preselected time thereby either breaking or releasing the snap ring and allowing the inner nozzle to be ejected from the outer nozzle.

5 Claims, 3 Drawing Figures

NOZZLE EJECTION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to rocket nozzles, and, more particularly, to a nozzle ejection system in which an auxiliary inner nozzle can be reliably and economically ejected from the permanent outer nozzle of a rocket.

Rocket nozzles are generally of the converging-diverging de Laval type and are used to accelerate gases to high exhaust velocities during rocket propulsion. The size and geometry of the nozzle have a critical influence on rocket chamber pressure, thrust propellant flow, exhaust velocity and the variation of these parameters with altitude and with each other.

The efficiency of a typical convergent-divergent rocket nozzle is dependent upon the relationship between the exit area of a nozzle and the pressure of the atmosphere in which it is operating. In the ascending phase of rocket flight the atmospheric pressure changes rapidly. Thus, a nozzle having a fixed exit area will operate at optimum conditions for a brief period only. Many devices have been utilized in the past to control the exit area in the divergent portion of a nozzle. These devices have inclined complex an undependable linkages, intricate and delicate electronic mechanisms and a series of explosive bolts for securing additional nozzles. The systems referred to above, however, are either expensive, unreliable or greatly increase the overall weight of the rocket.

SUMMARY OF THE INVENTION

The instant invention sets forth a nozzle ejection system which overcomes the problems set forth hereinabove and is capable of efficiently and reliably ejecting a rocket motor booster nozzle thereby either transitioning the rocket operation to a ramjet mode of operation, obtaining a lower sustain rocket thrust or terminating the rocket thrust to a very low level approaching zero.

The system of this invention incorporates an auxiliary or booster nozzle retained by a snap ring within a groove located in the exit cone of an outer nozzle such as a ramjet or sustain nozzle. An ordnance device is situated underneath the snap ring in the groove in the exit cone. The snap ring is ejected by firing the ordnance device which creates a driving force on the snap ring forcing it out of the groove. Once the snap ring is ejected the chamber pressure in the rocket motor drives the booster nozzle out of the outlet nozzle. The snap ring has a distance of 1 or 2 inches between its ends so that the ends never engage during its ejection sequence; thus minimizing the force required to eject it. As a result, no damage will occur to the ramjet or sustain motor exit cone since the ejection forces are small and decrease rapidly as the snap ring moves out of the groove.

It is therefore an object of this invention to provide a nozzle ejection system which provides reliable ejection of an auxiliary or booster nozzle at a minimum of weight increase to the rocket.

It is another object of this invention to provide a nozzle ejection system which finds applicability in a wide range of rocket engine designs.

It is a further object of this invention to provide a nozzle ejection system which is economical to produce, and which utilizes conventional, currently available components that lead themselves to standard mass producing manufacturing techniques.

For a better understanding of the present invention, together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
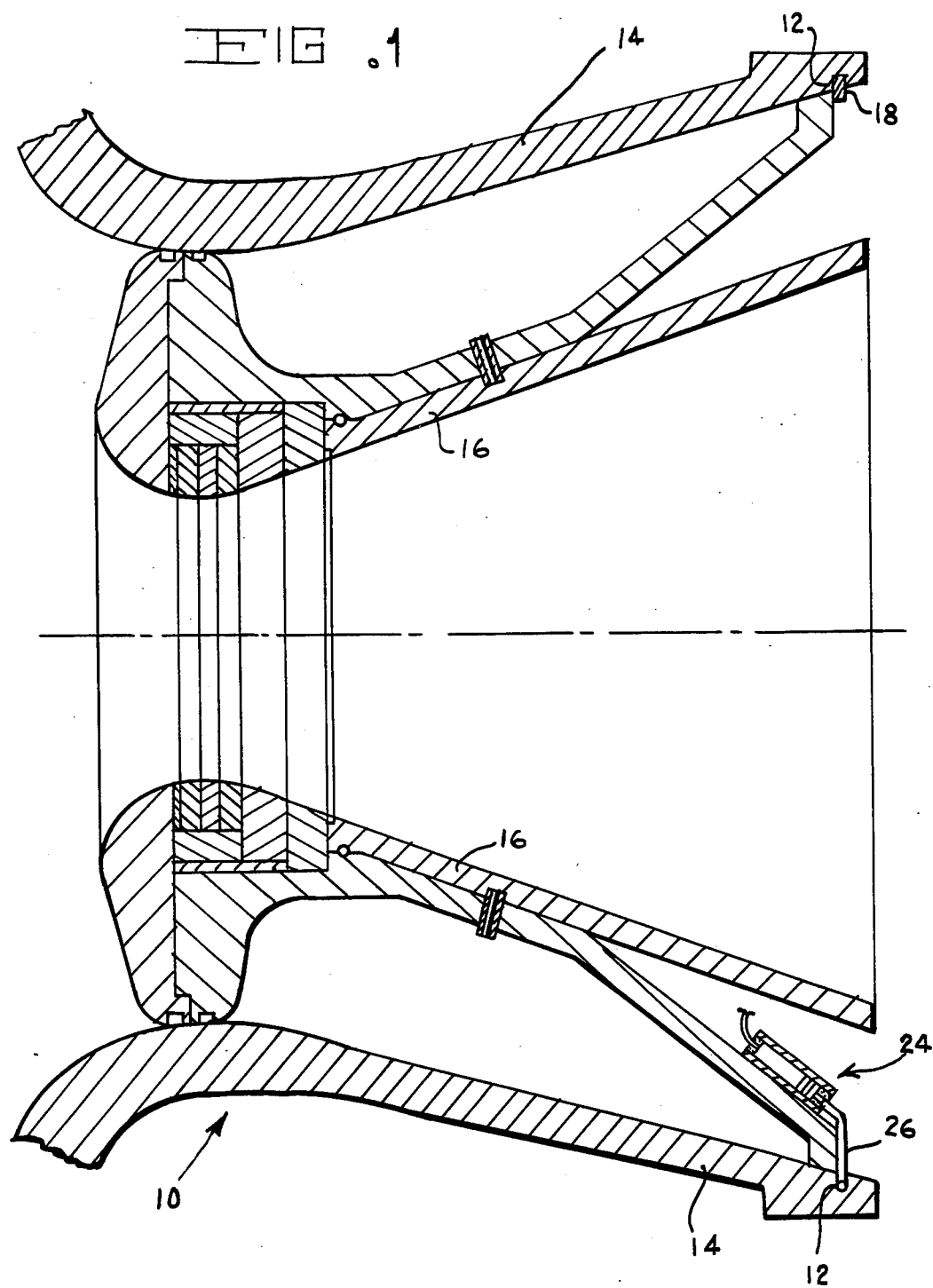
FIG. 1 is a side elevational view of the nozzle ejection system of this invention shown partly in cross-section.

Reference is now made to FIG. 1 of the drawing which shows the nozzle ejection system 10 of this invention. The ejection system 10 incorporates a groove or slot 12 formed along the inner periphery of any conventional ramjet jet or sustain nozzle which will hereinafter be referred to as outer nozzle 14. An auxiliary or inner nozzle 16 of conventional converging-diverging configuration of a lesser dimension than outer nozzle 14 is matingly mounted in slidable relationship within outer nozzle 14.

Figure 2:
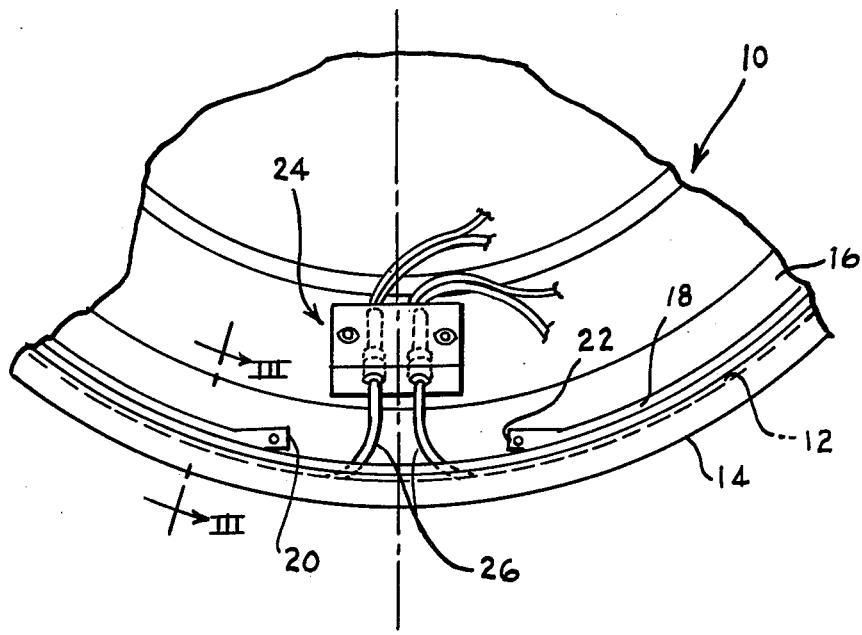
FIG. 2 is a front view of a portion of the nozzle ejection system of this invention.
Figure 3:
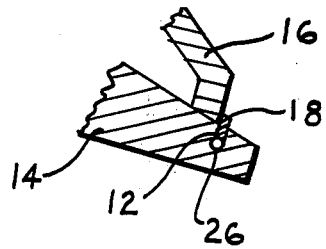
FIG. 3 is a cross-section of the nozzle ejection system of this invention taken along line III-III of FIG. 2.

Located within groove 12 and best shown in FIGS. 2 and 3 is a snap ring 18. Snap ring 18 is of a circular configuration of any suitable metal material capable of some degree of resilience. The ends 20 and 22 of snap ring 18 have a slight clearance of approximately 2 inches therebetween so that these ends 20 and 22 are incapable of engagement during the ejection sequence. Any suitable pyrotechnic device 24 is operatively connected to snap ring 18 by a conventional explosive cord 26 located within groove 12 underneath ring 18.

The snap ring 18 is ejected by the firing of ordinance or pyrotechnic device 24, thereby detonating explosive cord 26 within groove 12 creating a driving force on ring 18. This force is capable of either breaking ring 18 or forcing it out of groove 12. Once the snap ring 18 is ejected from groove 12, the rocket chamber pressure is sufficient to drive both ring 18 and auxiliary nozzle 16 out of nozzle 14.

In operation any suitable ordinance device 24 may be utilized, although it has been found that the ejection system 10 of this invention is capable of complete ejection of an 18 inch diameter snap ring 18 in 6msec independent of rocket pressure.

Although the invention has been described with reference to a particular embodiment, it will be understood to those skilled in the art that the invention is capable of a variety of alternate embodiments within the spirit and scope of the appended claims.

We claim:

1. A nozzle ejection system comprising a first nozzle, said first nozzle having a groove located along the inner periphery thereof, a second nozzle, said second nozzle positioned within said first nozzle, a snap ring located within said groove and in engagement with said second nozzle for retaining said second nozzle within said first nozzle and means operatively associated with said snap ring for releasing said snap ring at a predetermined time from said groove thereby permitting the ejection of said second nozzle from within said first nozzle.

2. A nozzle ejection system as defined in claim 1 wherein said snap ring is of a circular configuration having a pair of ends, said ends being in spaced relationship with one another.

3. A nozzle ejection system as defined in claim 2 wherein said releasing means comprises a pyrotechnic device.

4. A nozzle ejection system as defined in claim 3 wherein said pyrotechnic device includes an explosive cord, said explosive cord being located within said groove underneath said snap ring.

5. A nozzle ejection system as defined in claim 4 wherein said snap ring is made of a material having some degree of resilience.

* * * * *